(12) United States Patent
Tokuda et al.

(10) Patent No.: US 11,322,817 B2
(45) Date of Patent: May 3, 2022

(54) DIRECTIONAL COUPLER AND DIRECTIONAL COUPLER MODULE

(71) Applicant: Murata Manufacturing Co., Ltd., Kyoto (JP)

(72) Inventors: Daisuke Tokuda, Kyoto (JP); Hisanori Murase, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/077,429

(22) Filed: Oct. 22, 2020

(65) Prior Publication Data

US 2021/0043995 A1    Feb. 11, 2021

Related U.S. Application Data

(63) Continuation of application No. PCT/JP2019/017493, filed on Apr. 24, 2019.

(30) Foreign Application Priority Data

Apr. 25, 2018  (JP) .............................. JP2018-084455

(51) Int. Cl.
*H01P 5/18* (2006.01)
*H01P 1/10* (2006.01)
*H04B 1/04* (2006.01)

(52) U.S. Cl.
CPC .................. *H01P 5/18* (2013.01); *H01P 1/10* (2013.01); *H04B 1/04* (2013.01)

(58) Field of Classification Search
CPC .... H01P 5/18; H01P 5/184; H01P 1/10; H01P 1/127

See application file for complete search history.

(56) References Cited

U.S. PATENT DOCUMENTS

| 5,379,007 A * | 1/1995 | Nakahara ................ H01P 1/185 333/156 |
| 7,546,089 B2 * | 6/2009 | Bellantoni ............... H01P 5/04 333/101 |
| 2013/0027273 A1 | 1/2013 | Kuwajima et al. |
| 2016/0065167 A1 | 3/2016 | Granger-Jones et al. |
| 2016/0172737 A1 | 6/2016 | Srirattana et al. |

(Continued)

FOREIGN PATENT DOCUMENTS

| CN | 107210507 A | 9/2017 |
| JP | H08-223021 A | 8/1996 |

(Continued)

OTHER PUBLICATIONS

International Search Report for PCT/JP2019/017493 dated May 28, 2019.
Written Opinion for PCT/JP2019/017493 dated May 28, 2019.

*Primary Examiner* — Dean O Takaoka
(74) *Attorney, Agent, or Firm* — Pearne & Gordon LLP (57) ABSTRACT

A directional coupler includes: a main line; a sub line; a first switch, a first end of which is directly connected to one end of the sub line and a second end of which is connected to a first signal path that extends to an isolation port (ISO), which is a first port; and a second switch, a first end of which is directly connected to another end of the sub line and a second end of which is connected to a second signal path that extends to a coupling port (CPL), which is a second port.

12 Claims, 6 Drawing Sheets

(56) References Cited

U.S. PATENT DOCUMENTS

2016/0172740 A1\* 6/2016 Srirattana ............... H01P 5/185
333/111
2017/0373368 A1 12/2017 Srirattana et al.

FOREIGN PATENT DOCUMENTS

JP 2013-46305 A 3/2013
JP 2017-537555 A 12/2017

\* cited by examiner

PRIOR ART

DIRECTIONAL COUPLER AND DIRECTIONAL COUPLER MODULE

CROSS REFERENCE TO RELATED APPLICATIONS

This is a continuation of International Application No. PCT/JP2019/017493 filed on Apr. 24, 2019 which claims priority from Japanese Patent Application No. 2018-084455 filed on Apr. 25, 2018. The contents of these applications are incorporated herein by reference in their entireties.

BACKGROUND

Technical Field

The present disclosure relates to a directional coupler and a directional coupler module.

In the related art, there are techniques for reducing the insertion loss of a main line in a directional coupler (for example, refer to Patent Document 1).

Figure 12:
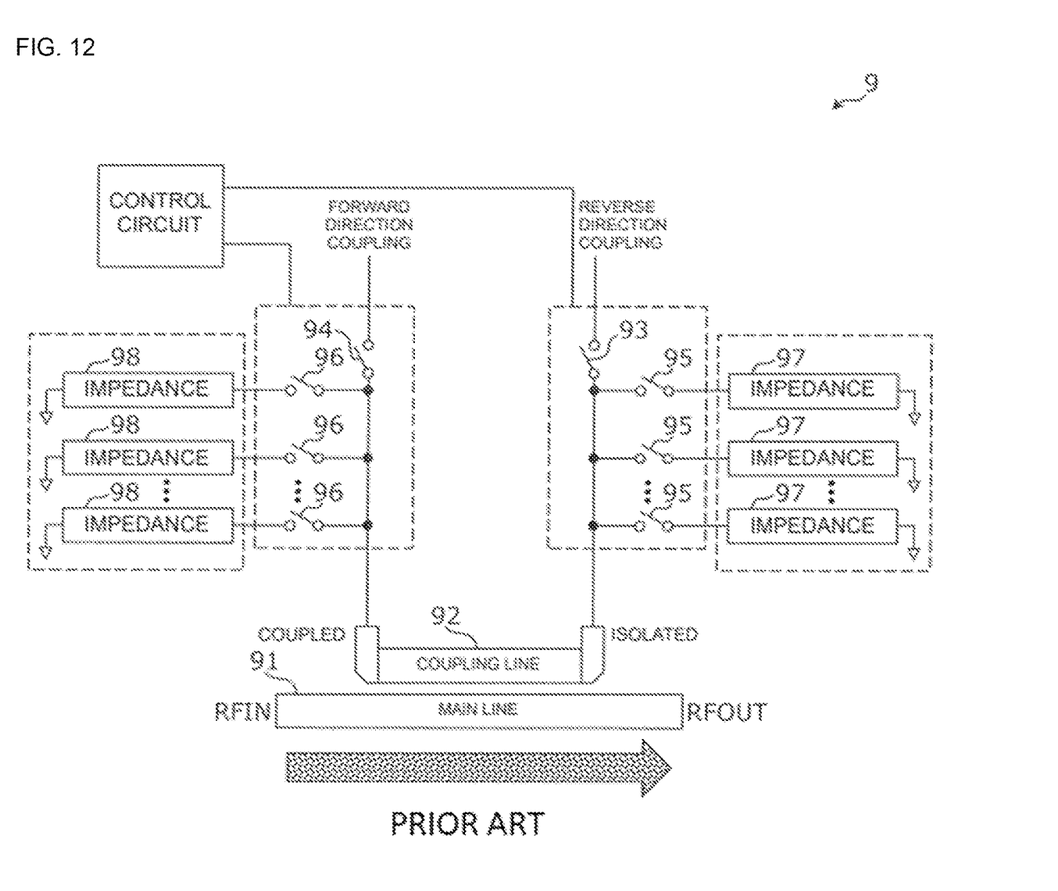
FIG. 12 is a circuit diagram illustrating an example of the functional configuration of a directional coupler according to an example of the related art.

FIG. 12 is a diagram illustrating an example of the functional configuration of an adjustable RF coupler disclosed in Patent Document 1. As illustrated in FIG. 12, an RF coupler 9 includes a main line 91, a coupling line 92, mode selection switches 93 and 94 and impedance selection switches 95 and 96 that are connected to the coupling line 92, and termination impedance elements 97 and 98 that are connected to the coupling line 92 via the impedance selection switches 95 and 96.

In the RF coupler 9, the mode selection switches 93 and 94 and the impedance selection switches 95 and 96 are all open at a non-detection time. This allows the coupling line 92 and the termination impedance elements 97 and 98 to be decoupled from the main line 91 and the insertion loss of the main line 91 can be reduced.

Note that the RF coupler 9, the main line 91, and the coupling line 92 in Patent Document 1 respectively correspond to a directional coupler, a main line, and a sub line in this specification.

Patent Document 1: Japanese Unexamined Patent Application Publication (Translation of PCT Application) No. 2017-537555

BRIEF SUMMARY

In the RF coupler 9, decoupling of the coupling line 92 and the termination impedance elements 97 and 98 from the main line 91 at a non-detection time means bringing the impedance of the coupling line 92, as seen from the main line 91, close to the impedance of an open circuit. In other words, in the RF coupler 9, it is thought that leaking of a signal from the main line 91 to the coupling line 92 is suppressed and the insertion loss of the main line 91 is reduced by bringing the impedance of the coupling line 92, as seen from the main line 91, close to the impedance of an open circuit.

However, in the RF coupler 9, the mode selection switches 93 and 94 may be arranged at a distance from the ends of the coupling line 92. In this case, there will be substantial parasitic inductances and parasitic resistances on the signal paths between the ends of the coupling line 92 and the mode selection switches 93 and 94. If the impedance seen when looking at the coupling line 92 from the main line 91 cannot be brought sufficiently close to the impedance of an open circuit due to the effect of the parasitic inductances and the parasitic resistances, the suppression of leaking of a signal from the main line 91 to the coupling line 92 may be insufficient and it may not be possible to sufficiently reduce the insertion loss of the main line 91.

Furthermore, since open switches generally function as capacitors, the characteristics of the RF coupler 9 will fluctuate due to unwanted signals flowing from the coupling line 92 into the main line 91 via the open mode selection switches 93 and 94.

The present disclosure provides a directional coupler that is excellent in terms of reducing the insertion loss of a main line thereof and in terms of the stability of the characteristics thereof.

An aspect of the present disclosure provides a directional coupler that includes a main line; a sub line; a first switch, a first end of which is directly connected to one end of the sub line and a second end of which is connected to a first signal path that extends to a first port; and a second switch, a first end of which is directly connected to another end of the sub line and a second end of which is connected to a second signal path that extends to a second port.

According to the thus-configured directional coupler, the sub line can be easily and securely isolated from the main line and the impedance of the sub line can be made to be the impedance of an open circuit by opening the first and second switches. Thus, since it is possible to weaken the coupling between the main line and the sub line and reduce the flow of an unwanted signal from the sub line to the main line at a non-detection time, a directional coupler can be obtained that is excellent in terms of reducing insertion loss in the main line and is excellent in terms of the stability of the characteristics thereof.

DETAILED DESCRIPTION

A plurality of embodiments of the present disclosure will be described in detail using the drawings. The embodiments described hereafter each illustrates a comprehensive or specific example of the present disclosure. The numerical values, shapes, materials, constituent elements, arrangement of the constituent elements, the ways in which the constituent elements are connected to each other and so forth given in the following embodiments are merely examples and are not intended to limit the present disclosure.

Embodiment 1

A directional coupler according to embodiment 1 includes switches that are for putting a sub line into an open circuit state, the switches being provided at one end and the other end of the sub line.

Figure 1:
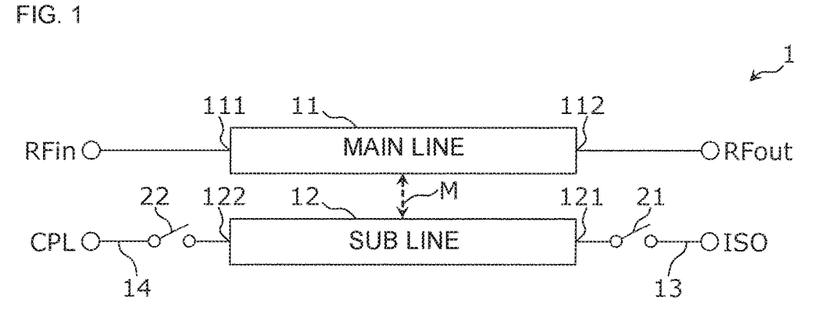
FIG. 1 is a circuit diagram illustrating an example of the functional configuration of a directional coupler according to embodiment 1.

FIG. 1 is a circuit diagram illustrating an example of the functional configuration of a directional coupler 1 according to embodiment 1. As illustrated in FIG. 1, the directional coupler 1 includes a main line 11, a sub line 12, signal paths 13 and 14, and switches 21 and 22. The main line 11 and the sub line 12 are electromagnetically coupled with each other as indicated by dotted arrow M in FIG. 1.

Ends 111 and 112 of the main line 11 are respectively connected to an input port RFin and an output port RFout.

Ends 121 and 122 of the sub line 12 are respectively directly connected to a first end of the switch 21 (left end in FIG. 1) and a first end of the switch 22 (right end in FIG. 1). In other words, the switch 21 and the switch 22 are respectively provided next to the ends 121 and 122 of the sub line 12.

A second end of the switch 21 (right end in FIG. 1) is connected to an isolation port ISO via the signal path 13 and a second end of the switch 22 (left end in FIG. 1) is connected to a coupling port CPL via the signal path 14. Note that connections may be provided such that the isolation port ISO and the coupling port CPL are swapped with each other. In other words, the coupling port CPL may be connected to the signal path 13 and the isolation port ISO may be connected to the signal path 14.

The switches 21 and 22 are opened at a non-detection time of the directional coupler 1 and short circuited at a detection time of the directional coupler 1 in accordance with control signals, which are not illustrated. A "non-detection time" of the directional coupler 1 refers to a time when a detection signal corresponding to an RF signal flowing through the main line 11 is not extracted from the sub line 12 and a "detection time" of the directional coupler 1 refers to a time when a detection signal corresponding to an RF signal flowing through the main line 11 is extracted from the sub line 12.

Here, the ends 121 and 122 are examples of one end and the other end of the sub line 12, respectively. The isolation port ISO is an example of a first port and the signal path 13 is an example of a first signal path that leads to the first port. Furthermore, the coupling port CPL is an example of a second port and the signal path 14 is an example of a second signal path that leads to the second port. In addition, the switches 21 and 22 are examples of a first switch and a second switch, respectively.

According to the thus-configured directional coupler 1, the sub line 12 can be easily and securely put into an open circuit state by opening the switches 21 and 22 at a non-detection time. Thus, since it is possible to weaken coupling between the main line and the sub line and reduce an unwanted signal flowing from the sub line to the main line at a non-detection time, the directional coupler 1 can be obtained that is excellent in terms of reducing insertion loss in the main line and is excellent in terms of the stability of the characteristics thereof. Note that in this specification, "put the sub line into an open circuit state" means making the impedance of the sub line be the impedance of an open circuit, specifically, making the impedance of the sub line, as seen from the main line, be the impedance of an open circuit.

The effect of reducing insertion loss in the main line 11 realized in the directional coupler 1 will be explained through comparison to a comparative example.

Figure 2:
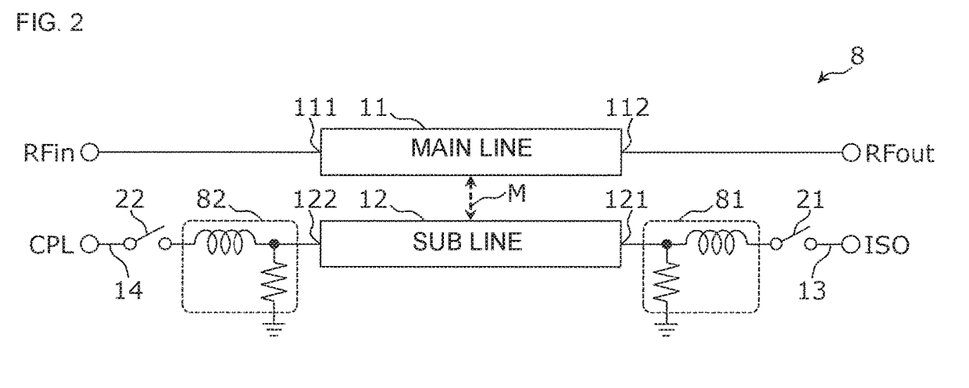
FIG. 2 is a circuit diagram illustrating an example of the functional configuration of a directional coupler according to a comparative example.

FIG. 2 is a circuit diagram illustrating an example of the functional configuration of a directional coupler according to a comparative example. As illustrated in FIG. 2, a directional coupler 8 differs from the directional coupler 1 in FIG. 1 in that the switches 21 and 22 are respectively connected to the ends 121 and 122 of the sub line 12 via impedance circuits 81 and 82. The impedance circuits 81 and 82 for example represent the parasitic inductances and parasitic resistances of wiring conductors connecting the ends 121 and 122 of the sub line 12 and the switches 21 and 22.

These parasitic inductances and parasitic resistances are generated when the switches 21 and 22 are connected at certain distances from the ends 121 and 122 of the sub line rather than when the switches 21 and 22 are provided at the ends 121 and 122 of the sub line. In other words, the directional coupler 8 differs from the directional coupler 1 in FIG. 1 in that the switches 21 and 22 are connected at positions that are further away from the ends 121 and 122 of the sub line 12.

Figure 3:
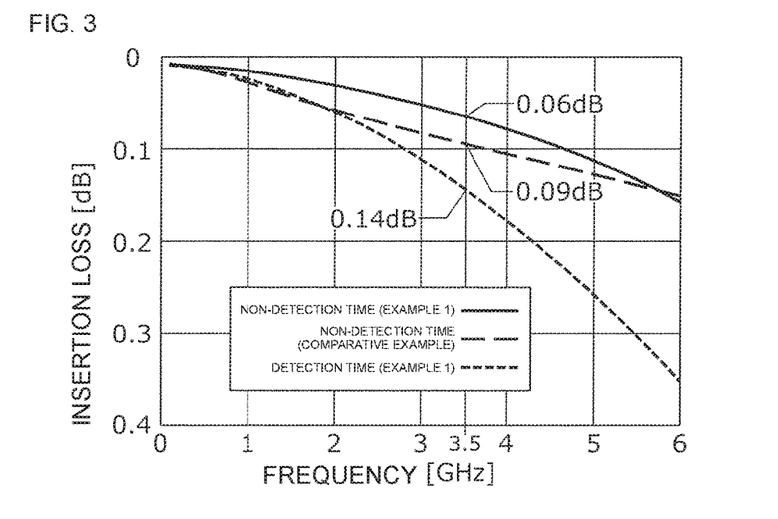
FIG. 3 is a graph illustrating examples of the insertion loss of the directional coupler according to embodiment 1.

FIG. 3 is a graph illustrating examples of the insertion loss in the main line 11 at a non-detection time and a detection time of the directional coupler 1 (example 1) and at a non-detection time of the directional coupler 8 (comparative example). The switches 21 and 22 of the directional couplers 1 and 8 are open at the non-detection time and are short circuited at the detection time.

As can be seen in FIG. 3, the insertion loss at the non-detection time in example 1 is significantly reduced from the insertion loss at the detection time in example 1, whereas the insertion loss at the non-detection time in the comparative example is not reduced as much as the insertion loss at the non-detection time in example 1. For example, the insertion loss in the main line 11 for a 3.5 GHz RF signal is 0.14 dB at the detection time in example 1 and is reduced to 0.06 dB at the non-detection time in example 1, whereas the insertion loss is only reduced to 0.09 dB at the non-detection time in the comparative example. In other words, the insertion loss reduction effect is smaller in the comparative example than in example 1.

When the switches 21 and 22 are opened at a non-detection time, the sub line 12 is put into an open circuit state in the directional coupler 1, whereas a signal flows from the sub line 12 to the impedance circuits 81 and 82 in the directional coupler 8. In other words, compared to the directional coupler 1, in the directional coupler 8, it is thought that the effect of reducing insertion loss will be smaller because the sub line 12 is not sufficiently open due to the effect of the impedance circuits 81 and 88. There is also a concern that unwanted signals may flow from the impedance circuits 81 and 82 to the main line 11 via the sub line 12 in the directional coupler 8, resulting in degradation of the characteristics of the directional coupler 8.

According to the directional coupler 1 in which the switches 21 and 22 are provided at the ends 121 and 122 of the sub line 12 as described above, the sub line 12 can be easily and securely put into an open circuit state by opening the switches 21 and 22. Thus, since it is possible to weaken the coupling between the main line 11 and the sub line 12 and reduce flow of an unwanted signal from the sub line 12 to the main line 11 at a non-detection time, the directional coupler 1 can be obtained that is excellent in terms of reducing insertion loss in the main line 11 and is excellent in terms of the stability of the characteristics thereof.

Next, examples of the specific positions of the ends 121 and 122 of the sub line 12 where the switches 21 and 22 are provided will be described while referring to the structure of the directional coupler 1.

The directional coupler 1 is formed in or on a mounting substrate, such as a printed wiring board or a mount component, such as an integrated circuit device and the main line 11 and the sub line 12 are formed of wiring conductors in or on the mounting substrate or mount component.

Figure 4:
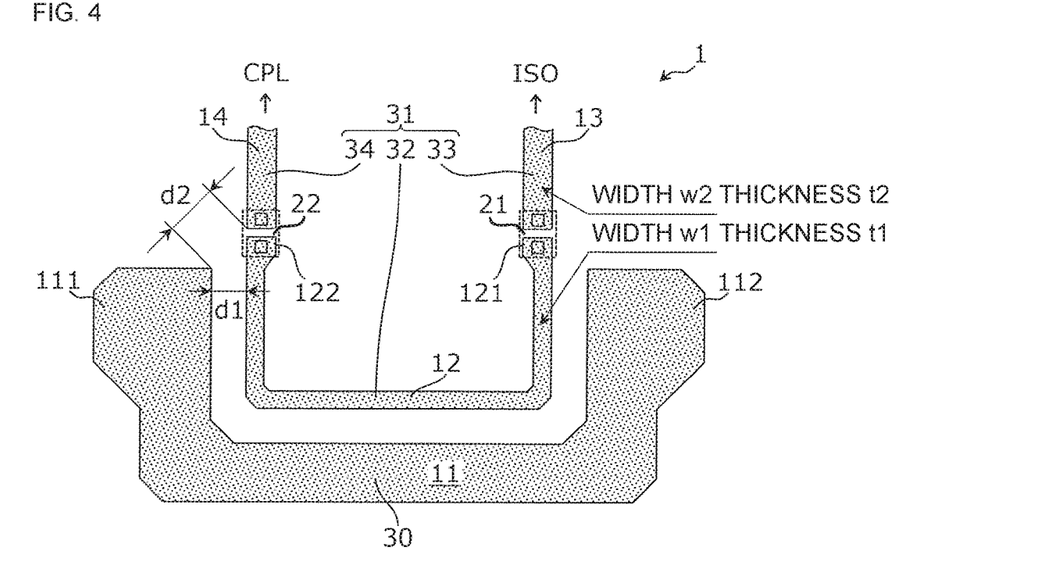
FIG. 4 is a plan view illustrating an example of the shapes of wiring conductors of the directional coupler according to embodiment 1.

FIG. 4 is a plan view illustrating an example of the shapes of wiring conductors forming the main line 11 and the sub line 12 of the directional coupler 1. As illustrated in FIG. 4, the directional coupler 1 includes wiring conductors 30 and 31.

The main line 11 is formed by the wiring conductor 30. The wiring conductor 31 is provided so to at least partially extend along the wiring conductor 30, that is, the main line 11. The sub line 12 is formed of a first section 32 of the wiring conductor 31. One end and the other end of the first section 32 of the wiring conductor 31 form the ends 121 and 122 of the sub line 12. The signal paths 13 and 14 are respectively formed by second sections 33 and 34 of the wiring conductor 31 that are located on both sides of the first section 32 of the wiring conductor 31. The switch 21 is provided between the first section 32 and the second section 33 of the wiring conductor 31 and the switch 22 is provided between the first section 32 and the second section 34 of the wiring conductor 31.

Specifically, the first end of the switch 21 (lower end in FIG. 4) is connected to an end, which is on the side near the second section 33, of the first section 32 of the wiring conductor 31 and the second end of the switch 21 (upper end in FIG. 4) is connected to an end, which is on the side near the first section 32, of the second section 33 of the wiring conductor 31. Furthermore, a first end of the switch 22 (lower end in FIG. 4) is connected to an end, which is on the side near the second section 34, of the first section 32 of the wiring conductor 31 and a second end of the switch 22 (upper end in FIG. 4) is connected to an end, which is on the side near the first section 32, of the second section 34 of the wiring conductor 31. In other words, the switches 21 and 22 are each provided so as to extend between the first section and the respective second section of the wiring conductor 31.

The wiring conductor 31 is electromagnetically coupled to the wiring conductor 30 substantially at the first section 32. In other words, in the wiring conductor 31, the degree of electromagnetic coupling between the first section 32 and the wiring conductor 30 is a substantially constant coupling degree c.1 and the degree of electromagnetic coupling between the second sections 33 and 34 and the wiring conductor 30 is a coupling degree c.2, which is much smaller than the coupling degree c.1. Therefore, the coupling degree of the directional coupler 1 is defined by the electromagnetic coupling between the first section 32 of the wiring conductor 31 and the wiring conductor 30 and the coupling degrees between the second sections 33 and 34 and the wiring conductor 30 do not affect the coupling degree of the directional coupler 1.

In order to obtain suitable electrical characteristics for the directional coupler 1, the wiring conductor 31 may satisfy one or more of the following geometrical conditions.

(Condition 1) The distance from the first section 32 to the wiring conductor 30 is d1, which is substantially constant, and the distance from the second sections 33 and 34 to the wiring conductor 30 is d2, which is different from d1. d2 does not necessarily have a constant value. That is, the distance from the wiring conductor 31 to the wiring conductor 30 is maintained at d1, which is substantially constant, along the entire length of the first section 32, whereas the distance from the wiring conductor 31 to the wiring conductor 30 is the distance d2, which is different from d1, at every point along the second sections 33 and 34, and the values of d2 may be different from each other in some places and other places in the second sections 33 and 34. In this case, the ends 121 and 122 of the sub line 12 are defined as the regions at which the distance from the wiring conductor 31 to the wiring conductor 30 changes from d1 to d2.

The distance from the first section 32 to the wiring conductor 30 refers to the shortest distance from one certain point on the side of the wiring conductor 31 near the wiring conductor 30 in the first section 32 to the wiring conductor 30. Furthermore, the distance from the second section 33 or 34 to the wiring conductor 30 refers to the shortest distance from one certain point on the side of the wiring conductor 31 near the wiring conductor 30 in the second section 33 or 34 to the wiring conductor 30.

(Condition 2) The line width of the first section 32 is w1, which is substantially constant, and the line width of the second sections 33 and 34 is w2, which is different from w1. w2 does not necessarily have a constant value. In other words, the line width of the wiring conductor 31 is maintained at w1, which is substantially constant, along the entire length of the first section 32, whereas the line width of the wiring conductor 31 is a line width w2, which is different from w1, at every point along the second sections 33 and 34, and the values of w2 may be different from each other in some places and other places in the second sections 33 and 34. In this case, the ends 121 and 122 of the sub line 12 are defined as the regions where the line width of the wiring conductor 31 changes from w1 to w2.

(Condition 3) The film thickness of the first section 32 is t1, which is substantially constant, and the film thickness of the second sections 33 and 34 is t2, which is different from t1. t2 does not necessarily have a constant value. In other words, the film thickness of the wiring conductor 31 is maintained at t1, which is substantially constant, along the entire length of the first section 32, whereas the film thickness of the wiring conductor 31 is a film thickness t2, which is different from t1, at every point along the second sections 33 and 34 and the values of t2 may be different from each other in some places and other places in the second sections 33 and 34. In this case, the ends 121 and 122 of the sub line 12 are defined as the regions where the film thickness of the wiring conductor 31 changes from t1 to t2.

It is easy to independently manage electrical characteristics using the first section 32 and the second sections 33 and 34 of the wiring conductor 31 by satisfying one or more of the above conditions. For example, the first section 32 may be designed so that the first section 32 is suitable for coupling with the wiring conductor 30 and the second sections 33 and 34 may be designed so that the second section 33 and 34 are suitable for transmission of signals.

In particular, the design and management of the magnitude of the electromagnetic coupling between the wiring conductor 31 and the wiring conductor 30 is simplified as a result of at least one out of the distance to the wiring conductor 30, the line width and the film thickness being substantially constant in the first section 32. As a result, the directional coupler 1 can be obtained that has excellent accuracy and stability with respect to the coupling degree.

Embodiment 2

A directional coupler according to embodiment 2 is configured by adding additional switches between the switches at both ends of the sub line and ground electrodes in the directional coupler of embodiment 1.

Figure 5:
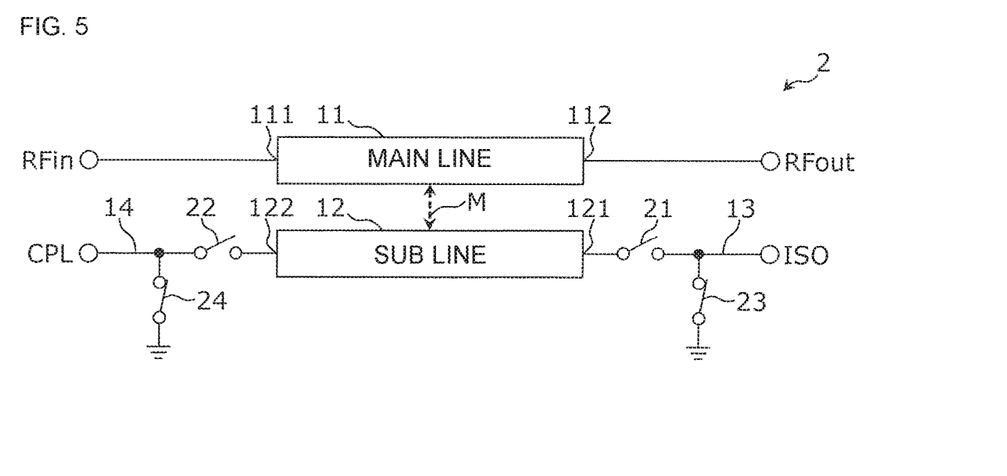
FIG. 5 is a circuit diagram illustrating an example of the functional configuration of a directional coupler according to embodiment 2.

FIG. 5 is a circuit diagram illustrating an example of the functional configuration of a directional coupler 2 according to embodiment 2. As illustrated in FIG. 5, compared with the directional coupler 1 in FIG. 1, the directional coupler 2 has additional switches 23 and 24. A first end of the switch 23 (upper end in FIG. 5) is connected to the second end of the switch 21 (right end in FIG. 5), that is, the end of the switch 21 that is connected to the signal path 13, and a second end of the switch 23 (lower end in FIG. 5) is connected to a ground electrode. A first end of the switch 24 (upper end in FIG. 5) is connected to the second end of the switch 22 (left end in FIG. 5), that is, the end of the switch 22 that is connected to the signal path 14, and a second end of the switch 24 (lower end in FIG. 5) is connected to a ground electrode.

The switch 21 and the switch 23 are switched on and off in an alternating manner with respect to each other in accordance with a control signal, which is not illustrated, and the switch 22 and the switch 24 are switched on and off in an alternating manner with respect to each other in accordance with a control signal, which is not illustrated. In other words, the switches 21 and 22 are opened and the switches 23 and 24 are short circuited at a non-detection time of the directional coupler 2. In addition, the switches 21 and 22 are short circuited and the switches 23 and 24 are opened at a detection time of the directional coupler 2.

Here, the switches 23 and 24 are examples of a third switch and a fourth switch, respectively.

According to the directional coupler 2, since the switches 21 and 22 are opened and the switches 23 and 24 are short circuited at a non-detection time, radio-frequency signals that pass through the open switches 21 and 22 can be terminated by the switches 23 and 24. In other words, it is possible to suppress flowing of a radio-frequency signal from the main line 11 to the first signal path 13 and the second signal path 14 and flowing of a radio-frequency signal from the first signal path 13 and the second signal path 14 to the main line 11 via the open switches 21 and 22.

Therefore, in the directional coupler 2, compared to the directional coupler 1, the sub line 12 is more completely in an open circuit state at a non-detection time (i.e., the impedance of the sub line 12, as seen from the main line 11, is closer to the impedance of an open circuit), and unwanted signals are less likely to flow into the main line 11 via the sub line 12. Furthermore, since the switches 23 and 24 are open at a detection time, the switches 23 and 24 do not practically affect the detection operation. As a result, the directional coupler 2 can be obtained that is excellent in terms of reduction of insertion loss in the main line 11 and in terms of the stability of the characteristics thereof.

The effect of reducing insertion loss in the main line in the directional coupler 2 will be explained through comparison with the directional coupler 1.

Figure 6:
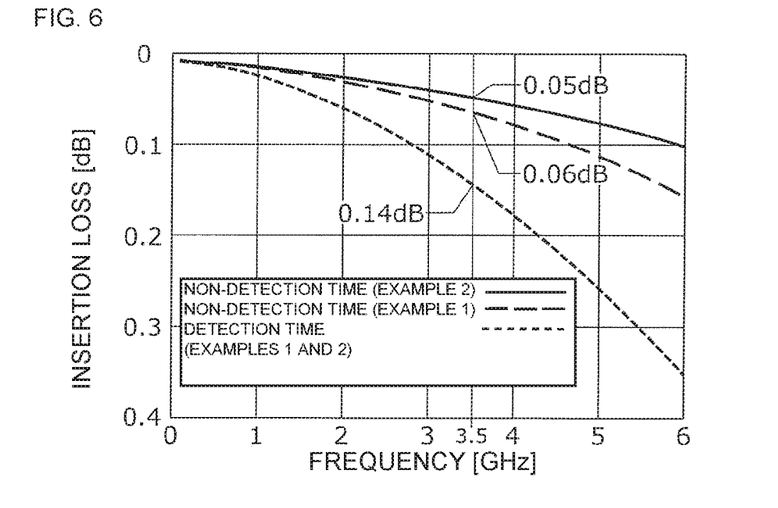
FIG. 6 is a graph illustrating examples of the coupling degree of the directional coupler according to embodiment 2.

FIG. 6 is a graph illustrating examples of the insertion loss in the main line 11 at a non-detection time and a detection time of the directional coupler 2 (example 2) and at a non-detection time of the directional coupler 1 (example 1).

As can be seen in FIG. 6, the insertion loss at a detection time in example 1 and the insertion loss at a detection time in example 2 are substantially identical and this indicates that the switches 23 and 24 have practically no effect on the insertion loss at a detection time. In contrast, the insertion loss at a non-detection time in example 2 is smaller than the insertion loss at a non-detection time in example 1. For example, the insertion loss for a 3.5 GHz RF signal is 0.14 dB at a detection time in both examples 1 and 2, and is 0.06 dB at a non-detection time in example 1 and is further reduced to 0.05 dB at a non-detection time in example 2. In other words, the insertion loss reduction effect is larger in example 2 than in example 1.

In the directional coupler 2, radio-frequency signals that pass through the open switches 21 and 22 are terminated at the switches 23 and 24 by the switches 23 and 24 at a non-detection time. Therefore, compared to the directional coupler 1, it is considered that the sub line 12 is more completely open and the insertion loss of the main line 11 is reduced to a greater degree. Furthermore, in the directional coupler 2, since radio-frequency signals that pass through the open switches 21 and 22 are terminated at the switches 23 and 24, it is less likely that unwanted signals will flow into the main line 11 via the sub line 12 compared with the directional coupler 1.

Thus, since it is possible to weaken the coupling between the main line 11 and the sub line 12 and reduce flow of unwanted signals from the sub line 12 to the main line 11 at a non-detection time, the directional coupler 2 can be obtained that is excellent in terms of reducing insertion loss in the main line 11 and is excellent in terms of the stability of the characteristics thereof.

Note that the arrangement of the switches 23 and 24 is not limited to the example illustrated in the directional coupler 2 in FIG. 5. For example, the following modifications are possible.

Figure 7:
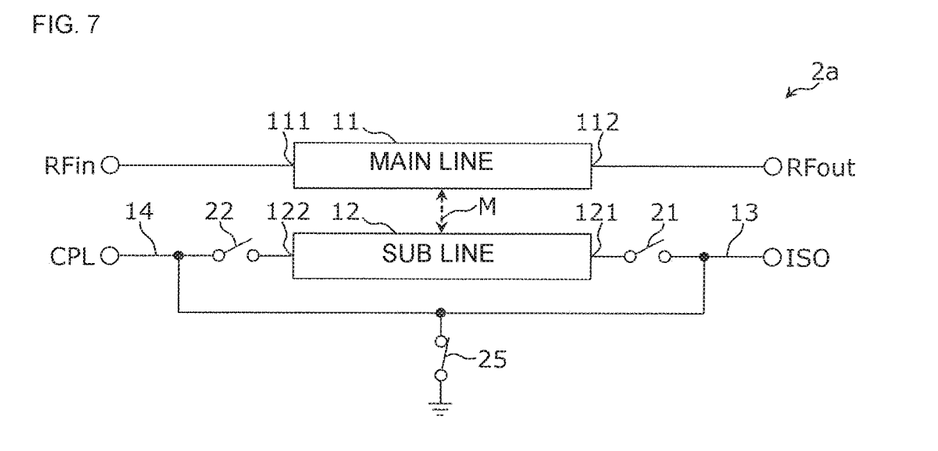
FIG. 7 is a circuit diagram illustrating an example of the functional configuration of a directional coupler according to modification 1 of embodiment 2.

FIG. 7 is a circuit diagram illustrating an example of the functional configuration of a directional coupler 2a according to modification 1 of embodiment 2. As illustrated in FIG. 7, the directional coupler 2a differs from the directional coupler 2 in FIG. 5 in that the switches 23 and 24 are configured using a single common switch 25. A first end of the common switch 25 (upper end in FIG. 7) is connected to both the second end of the switch 21 (right end in FIG. 7) and the second end of the switch 22 (left end in FIG. 7) and a second end of the common switch 25 (lower end in FIG. 7) is connected to a ground electrode.

According to the directional coupler 2a, since the switches 23 and 24 are formed using a single common switch 25, the directional coupler 2a can be reduced in size.

Figure 8:
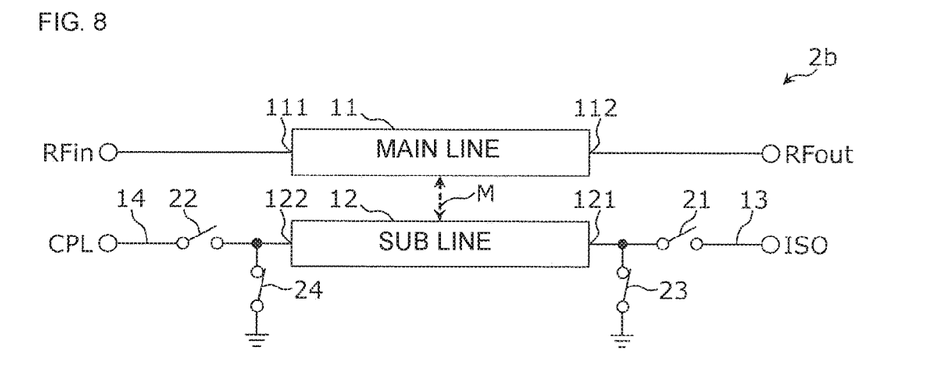
FIG. 8 is a circuit diagram illustrating an example of the functional configuration of a directional coupler according to modification 2 of embodiment 2.

FIG. 8 is a circuit diagram illustrating an example of the functional configuration of a directional coupler 2b according to modification 2 of embodiment 2. As illustrated in FIG. 8, the directional coupler 2b differs from the directional coupler 2 in FIG. 5 in that the first end of the switch 23 (upper end in FIG. 8) is connected to the first end of the switch 21 (left end in FIG. 8) and the first end of the switch 24 (upper end in FIG. 8) is connected to the first end of the switch 22 (right end in FIG. 8). In other words, in the directional coupler 2b, the switches 23 and 24 are also respectively directly connected to the one end and the other end of the sub line similarly to the switches 21 and 22.

In the directional coupler 2b as well, since radio-frequency signals that pass through the open switches 21 and 22 can be terminated by the switches 23 and 24, the directional coupler 2b can be obtained that is excellent in terms of reduction of insertion loss in the main line 11 and in terms of the stability of the characteristics thereof.

The switches 23, 24, and 25 may be opened at the same time as the switches 21 and 22 at a non-detection time of the directional couplers 2, 2a, and 2b. Also in the case where all the switches 21 to 25 are open at a non-detection time in the directional couplers 2, 2a, and 2b, coupling between the main line 11 and the sub line 12 can be weakened and flowing of an unwanted signal from the sub line 12 to the main line 11 can be reduced at a non-detection time similarly to as in the case where the switches 21 and 22 are open at a non-detection time in the directional coupler 1 illustrated in FIG. 1. Furthermore, in the case where the switches 21 and 22 are open, the impedance of the main line 11 is different when the switches 23, 24, and 25 are short circuited and when the switches 23, 24, and 25 are open. Therefore, whether the switches 23, 24, and 25 are to be short circuited or opened at a non-detection time in the directional couplers 2, 2a, and 2b may be determined in accordance with the magnitude of the impedance required in the main line 11.

Embodiment 3

A directional coupler according to embodiment 3 is configured by adding a terminator, which terminates the sub line, to the directional coupler of embodiment 2.

Figure 9:
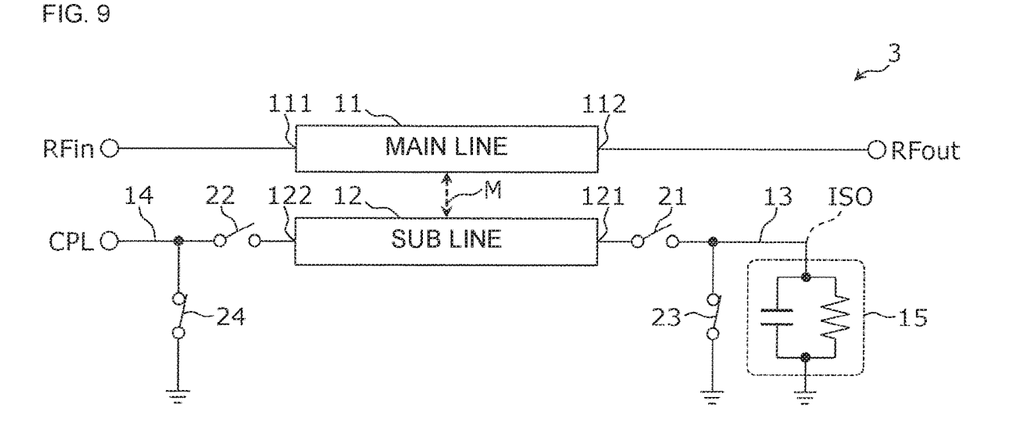
FIG. 9 is a circuit diagram illustrating an example of the functional configuration of a directional coupler according to embodiment 3.

FIG. 9 is a circuit diagram illustrating an example of the functional configuration of a directional coupler 3 according to embodiment 3. As illustrated in FIG. 9, the directional coupler 3 is configured by adding a terminator 15 to the directional coupler 2 in FIG. 5.

One end of the terminator 15 is connected to the signal path 13 that is on the side near the isolation port ISO and the isolation port ISO serving as an external connection terminal is omitted. The other end of the terminator 15 is connected to a ground electrode. The terminator 15 is not particularly limited, but as an example may be configured as a circuit in which a capacitor and a resistor are connected in parallel with each other. The terminator 15 terminates the isolation port ISO. Note that the terminator 15 may instead be connected to the signal path 14 on the side near the coupling port CPL and may terminate the coupling port CPL.

According to this configuration, matching can be improved by terminating the sub line 12 with the terminator 15 at a detection time and the directionality of the directional coupler 3 can be improved. Furthermore, at a non-detection time, the sub line 12 is decoupled from the main line 11 without necessarily being affected by the impedance of the terminator 15 by opening the switches 21 and 23, which are located closer to the end 121 of the sub line 12 than the terminator 15, and thus the directional coupler 3 can be obtained that is excellent in terms of reducing insertion loss in the main line 11 and in terms of the stability of the characteristics thereof.

Embodiment 4

A directional coupler according to embodiment 4 is configured by adding a filter, which processes a signal extracted from the sub line, to the directional coupler of embodiment 2.

Figure 10:
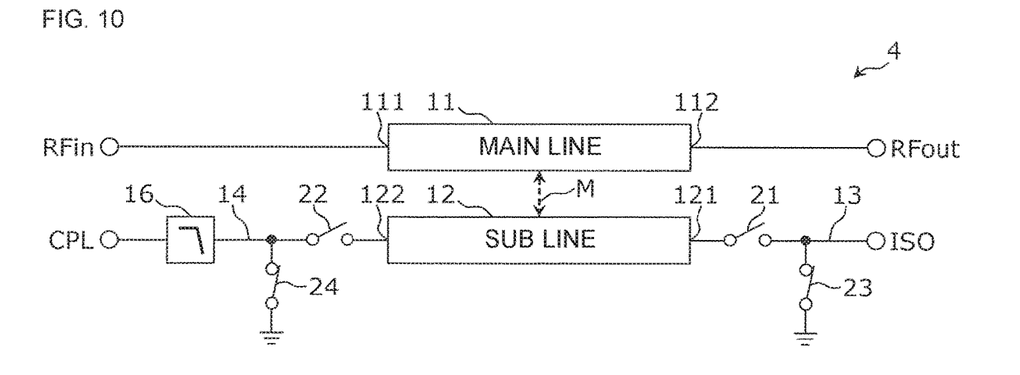
FIG. 10 is a circuit diagram illustrating an example of the functional configuration of a directional coupler according to embodiment 4.

FIG. 10 is a circuit diagram illustrating an example of the functional configuration of a directional coupler 4 according to embodiment 4. As illustrated in FIG. 10, the directional coupler 4 is configured by adding a filter 16 to the directional coupler 2 in FIG. 5. The filter 16 is provided on the signal path 14.

With this configuration, at a detection time, an unwanted signal component included in a detection signal extracted from the end 122 of the sub line 12 is removed by the filter 16 and the resulting signal is output to the coupling port CPL, and as a result the detection accuracy of the directional coupler 4 can be improved. The filter 16 also functions as a matching network, which is an impedance circuit, and therefore an effect of the matching at the end 122 of the sub line being improved is also expected. Furthermore, at a non-detection time, the sub line 12 is decoupled from the main line 11 without necessarily being affected by the impedance of the filter 16 by opening the switches 22 and 24, which are located closer to the end 122 of the sub line 12 than the filter 16, and thus the directional coupler 4 can be obtained that is excellent in terms of reducing insertion loss in the main line 11 and in terms of the stability of the characteristics thereof.

Embodiment 5

The directional couplers 2, 2a, 2b, 3, and 4 of embodiments 2 to 4 provided with the switches 21 to 24 are particularly useful in directional coupler modules provided with a plurality of directional couplers. Hereafter, a directional coupler module according to embodiment 5 and the effects thereof will be described by taking a directional coupler module provided with a plurality of directional couplers as an example.

Figure 11:
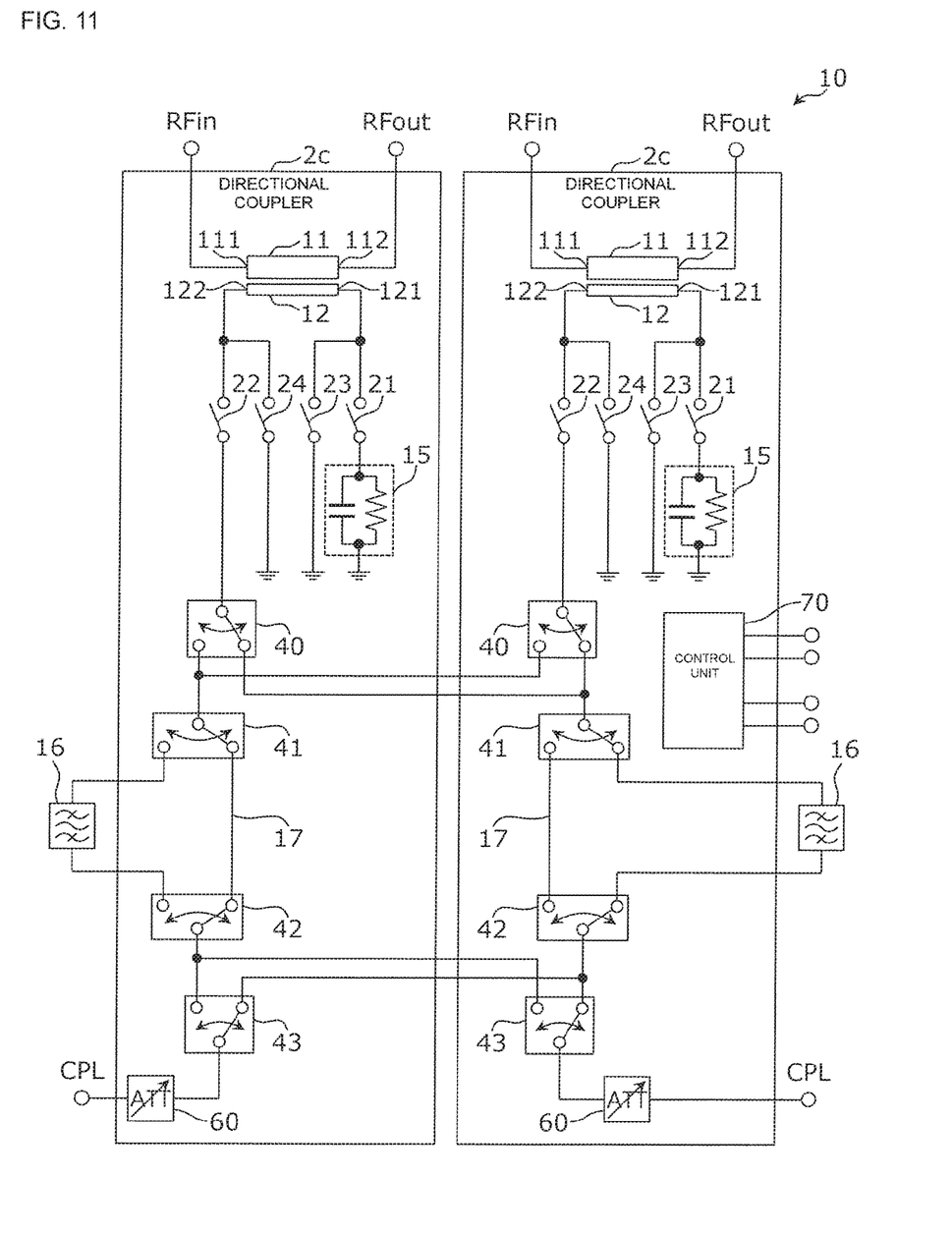
FIG. 11 is a circuit diagram illustrating an example of the functional configuration of a directional coupler module according to embodiment 5.

FIG. 11 is a circuit diagram illustrating an example of the functional configuration of a directional coupler module 10 according to embodiment 5.

The directional coupler module 10 includes two directional couplers 2c. Hereafter, the configuration of one directional coupler 2c will be described as a representative example assuming that the two directional couplers 2c have the same configuration.

Each directional coupler 2c includes the directional coupler 2b (refer to FIG. 8) according to modification 2 of embodiment 2. In each directional coupler 2c, the first end of the switch 21 (upper end in FIG. 11) and the first end of the switch 23 (upper end in FIG. 11) are connected to the end 121 of the sub line 12. In addition, the first end of the switch 22 (upper end in FIG. 11) and the first end of the switch 24 (upper end in FIG. 11) are connected to the end 122 of the sub line 12.

The directional coupler 2c further includes the terminator 15, the filter 16, switch circuits 40, 41, 42, and 43, a variable attenuator 60, and a control unit 70. Note that the control unit 70 of the left-side directional coupler 2c is omitted from FIG. 11.

The terminator 15 is connected to the sub line 12 via the switch 21 and terminates the end 121 of the sub line 12.

The filter 16 is connected to the directional coupler 2c via the switch circuits 41 and 42. The two filters 16 connected to the different directional couplers 2c are filters having different frequency bands as pass bands, for example.

The switch circuit 40 is connected to the sub line 12 and switches the connection target of the end 122 of the sub line 12.

The switch circuit 41 is connected to the filter 16 and a bypass path 17 and performs switching so as to connect either the filter 16 or the bypass path 17 to the sub line 12.

The switch circuit 42 is connected to the filter 16 and the bypass path 17 and performs switching so as to connect either the filter 16 or the bypass path 17 to the coupling port CPL.

The switch circuit 43 switches which of the two directional couplers 2c is connected to which coupling port CPL among the two directional couplers 2c and the two coupling ports CPL.

The variable attenuator 60 is connected between the switch circuit 43 and the coupling port CPL.

The control unit 70 generates control signals for controlling the switches 21 to 24 and the switch circuits 40, 41, 42, and 43.

Note that the terminator 15, the filter 16, the switch circuits 40, 41, 42, and 43, the variable attenuator 60, and the control unit 70 do not have to be provided in the directional coupler 2c or the directional coupler module 10. In other words, any of the terminator 15, the filter 16, the switch circuits 40, 41, 42, and 43, the variable attenuator 60, and the control unit 70 may be provided as an external component that is separate from the directional coupler 2c or the directional coupler module 10.

The directional coupler module 10 switches which directional coupler 2c is used in accordance with the frequency band and so forth of the signal to be detected. In other words, in the case where detection is performed using one directional coupler 2c among the two directional couplers 2c, the other directional coupler 2c is not used. In other words, in the case where one directional coupler 2c is at a detection time, the other directional coupler 2c is at a non-detection time.

In the directional coupler 2c that is not being used, the switches 23 and 24 are short circuited and the ends 121 and 122 of the sub line 12 of the directional coupler 2c that is not being used are connected to ground. Thus, unwanted signals are prevented from leaking or being superimposed on the signal output from the directional coupler 2c (signal to be detected) that is being used by grounding the signal output from the directional coupler 2c that is not being used and minimizing the voltage amplitude, and as a result the isolation of the directional coupler module 10 can be improved. Furthermore, in the case where the signal to be detected and the unwanted signal are signals that have opposite directions from each other, the directionality of the directional coupler module 10 can be improved.

Furthermore, if the pass bands of the two filters 16 are different from each other, the frequency selection performance of the directional coupler module 10 can be improved if the frequency band of the signal to be detected is included in the passband of one filter and the frequency band of the unwanted signal is included in the passband of the other filter.

A configuration is illustrated in FIG. 11 in which the end 121 is connected to the terminator 15 serving as the isolation port ISO and the end 122 is connected to the coupling port CPL by the switches 21 to 24, but the configurations of switches 21 to 24 may be changed and furthermore the connection target of the end 121 and the connection target of the end 122 may be swapped with each other. In this case, both a forward-direction signal (a signal passing along the main line 11 from the input port RFin to the output port RFout) and a reverse-direction signal (a signal passing along the main line 11 from the output port RFout to the input port RFin) can be detected by the directional coupler module 10.

In addition, the directional coupler module 10 that includes a plurality of directional couplers 2c each using the directional coupler 2b is exemplified in FIG. 11, but the directional coupler used as the directional couplers forming the directional coupler module 10 is not limited to the directional coupler 2b. The directional coupler module 10 may be formed using any directional coupler among the directional couplers 2, 2a, 2b, 3, and 4 according to embodiments 2 to 4 and the modifications thereof.

Directional couplers and a directional coupler module according to embodiments of the present disclosure have been described above, but the present disclosure is not limited to these individual embodiments.

Various modifications, as thought of by those skilled in the art, made to the embodiments and other embodiments formed by combining constituent elements of different embodiments may also be included in the scope of one or a plurality of modes of the present disclosure so long as the modifications and embodiments do not depart from the spirit of the present disclosure.

INDUSTRIAL APPLICABILITY

The present disclosure can be widely used as a directional coupler.

REFERENCE SIGNS LIST 1, 2, 2a, 2b, 2c, 3, 4, 8 directional coupler
9 RF coupler
10 directional coupler module
11 main line
12 sub line
13, 14 signal path
15 terminator
16 filter
17 bypass path
21, 22, 23, 24 switch
25 common switch
30, 31 wiring conductor
32 first section
33, 34 second section
40, 41, 42, 43 switch circuit
60 variable attenuator
70 control unit
81, 82 impedance circuit
91 main line
92 coupling line
93, 94 mode selection switch
95, 96 impedance selection switch
97, 98 termination impedance element
111, 112, 121, 122 end

The invention claimed is:

1. A directional coupler comprising:
a main line;
a sub line;
a first switch, a first end of the first switch being directly connected to a first end of the sub line, and a second end of the first switch being connected to a first signal path that extends to a first port;
a second switch, a first end of the second switch being directly connected to a second end of the sub line, and a second end of the second switch being connected to a second signal path that extends to a second port; and
a wiring conductor, at least part of the wiring conductor extending along a direction the main line, wherein:

a first section of the wiring conductor is the sub line, and second sections of the wiring conductor extend from the first and second switches to the first and second ports,
a first line width of the first section is substantially constant, and a second line width of the second section is different from the first line width, and
a line width of the wiring conductor changes from the first width to the second width at the first and second ends of the sub line.

2. The directional coupler according to claim 1, further comprising:
a wiring conductor, at least part of the wiring conductor extending along a direction of the main line, wherein:
a first section of the wiring conductor is the sub line, and second sections of the wiring conductor extend from the first and second switches to the first and second ports,
a first distance from the first section to the main line is substantially constant, and a second distance from the second sections to the main line is different from the first distance, and
a distance from the wiring conductor to the main line changes from the first distance to the second distance at the first and second ends of the sub line.

3. The directional coupler according to claim 1, further comprising:
a wiring conductor, at least part of the wiring conductor extending along a direction the main line, wherein:
a first section of the wiring conductor is the sub line, and second sections of the wiring conductor extend from the first and second switches to the first and second ports,
a first film thickness of the first section is substantially constant, a second film thickness of the second sections is different from the first thickness, and
a film thickness of the wiring conductor changes from the first thickness to the second thickness at the first and second ends of the sub line.

4. The directional coupler according to claim 1, further comprising:
a wiring conductor, at least part of the wiring conductor extending along a direction the main line, wherein:
a first section of the wiring conductor is the sub line, and second sections of the wiring conductor extend from the first and second switches to the first and second ports,
a first degree of coupling between the first section and the main line is substantially constant, and a second degree of coupling between the second sections and the main line is less than the first degree of coupling, and
the first end and the second end of the sub line are at a first end and a second end of the first section of the wiring conductor, respectively.

5. The directional coupler according to claim 1, further comprising:
a third switch, a first end of the third switch being connected to the first switch and a second end of the third switch being connected to a ground electrode; and
a fourth switch, a first end of the fourth switch being connected to the second switch and a second end of the fourth switch connected to a ground electrode.

6. The directional coupler according to claim 5, wherein the first end of the third switch is connected to the second end of the first switch, and the first end of the fourth switch is connected to the second end of the second switch.

7. The directional coupler according to claim 6, wherein:
the third switch and the fourth switch are a single common switch, and
a first end of the common switch is connected to both of the second end of the first switch and the second end of the second switch, and a second end of the common switch is connected to a ground electrode.

8. The directional coupler according to claim 5, wherein:
the third switch is short circuited when the first switch is open, and the third switch is open when the first switch is short circuited, and
the fourth switch is short circuited when the second switch is open, and the third switch is open when the second switch is short circuited.

9. The directional coupler according to claim 5, wherein the second switch is open when the first switch is open, and the second switch is short circuited when the first switch is short circuited.

10. The directional coupler according to claim 1, further comprising:
a terminator that is connected between a ground electrode and the first signal path or the second signal,
wherein the terminator terminates the first port or the second port.

11. The directional coupler according to claim 1, further comprising:
a filter in the first signal path or the second signal path.

12. A directional coupler module comprising:
first and second directional couplers according to claim 5,
wherein the third switch and the fourth switch of the second directional coupler are short circuited when the first directional coupler is used for detection, and
the third switch and the fourth switch of the first directional coupler are short circuited when the second directional coupler is used for detection.

* * * * *